United States Patent [19]

Sekiguchi

[11] 4,373,400

[45] Feb. 15, 1983

[54] SIGNAL GENERATOR FOR ELECTROMAGNETIC FLOWMETERS

[75] Inventor: Toshio Sekiguchi, Tokyo, Japan

[73] Assignee: Hokushin Elect. Works, Ltd., Tokyo, Japan

[21] Appl. No.: 216,249

[22] Filed: Dec. 15, 1980

[30] Foreign Application Priority Data

Dec. 17, 1979 [JP] Japan .................. 54-162847

[51] Int. Cl.³ .............................................. G01F 1/60
[52] U.S. Cl. ............................. 73/861.12; 73/861.16
[58] Field of Search ............ 73/861.12, 861.16, 861.17

[56] References Cited

U.S. PATENT DOCUMENTS

| | | | |
|---|---|---|---|
| 3,894,430 | 7/1975 | Rummel et al. | 73/861.17 |
| 3,955,413 | 5/1976 | Steele et al. | 73/861.17 |
| 4,137,766 | 2/1979 | Handel | 73/861.16 X |
| 4,156,363 | 5/1979 | Suzuki et al. | 73/861.16 |
| 4,169,375 | 10/1979 | Suzuki | 73/861.16 |
| 4,262,542 | 4/1981 | Freund, Jr. et al. | 73/861.12 |

Primary Examiner—Charles A. Ruehl
Attorney, Agent, or Firm—Michael Ebert

[57] ABSTRACT

A signal generator for an electromagnetic flowmeter provided with a flow tube having an insulated liner through which a fluid to be metered flows to intercept an electromagnetic field established therein to induce a signal depending on flow rate in a pair of electrodes mounted at diametrically-opposed positions on the tube. The field is created by an excitation coil to which is applied an excitation current derived from an external power supply. This signal generator incorporates a current-setting circuit for setting the excitation current to a value establishing a constant relationship between the flow rate of the fluid and the signal yielded by the electrodes.

4 Claims, 8 Drawing Figures

4,373,400

SIGNAL GENERATOR FOR ELECTROMAGNETIC FLOWMETERS

BACKGROUND OF INVENTION

This invention relates to improved signal generators to be incorporated in electromagnetic flowmeters.

An electromagnetic flowmeter is constituted by a signal generator and a converter. The generator includes a flow tube having an insulated lining through which the fluid to be metered flows, the fluid intercepting a magnetic field established in the flow tube by an excitation coil to induce an electromotive force signal in a pair of electrodes mounted on the tube.

The electromotive force signal thereby produced is in accordance with the magnetic field intensity and the flow rate of the fluid, this signal being converted by a converter coupled to the signal generator into a current that lies within a predetermined range to provide a flow rate output.

The excitation coil of the signal generator is excited by a current derived from an external power supply that is included in the converter or at a remote point. Since a deviation in this excitation current causes a measurement error, this current is usually set in the converter or at the remote point.

However, the diameter of the flow tube of the signal generator in a flowmeter depends on the flow rate to be measured, different diameters being used for various applications. The set value of the excitation current varies accordingly, so that it is general practice in the prior art to install the signal generator at the measurement site and then set the excitation current. It is therefore necessary to re-set the excitation current each time a given signal generator is replaced with a new generator.

That is, in the prior art there is a lack of replaceability with respect to the relationship between the signal generator and the converter. This gives rise to the disadvantage that even if the converter remains unchanged, it is necessary to set the excitation current in the field each time a new signal generator is combined with the converter. Should the field setting of the excitation current be incorrect, this results in a measurement error.

SUMMARY OF INVENTION

The main object of this invention is to overcome the above-noted drawback of existing electromagnetic flowmeters by providing a signal generator therefor which incorporates an excitation current-setting circuit.

A salient feature of the invention resides in the fact that the current-setting circuit acts to pre-set the excitation current to a value establishing a constant relationship between the flow rate of the fluid being metered and the electromotive force signal induced in the electrodes of the flow tube, thereby obviating the need to carry out current-setting operations in the field and making it possible to replace the signal generator and still retain the proper relationship between the signal generator and the converter associated therewith.

OUTLINE OF DRAWINGS

For a better understanding of the invention as well as other objects and further features thereof, reference is made to the following detailed description to be read in conjunction with the accompanying drawings, wherein:

FIG. 1 is a block diagram of a first embodiment of a flowmeter in accordance with the invention which employs an alternating rectangular wave excitation current;

FIG. 2A schematically illustrates the current-setting circuit used in FIG. 1;

Figure 3:
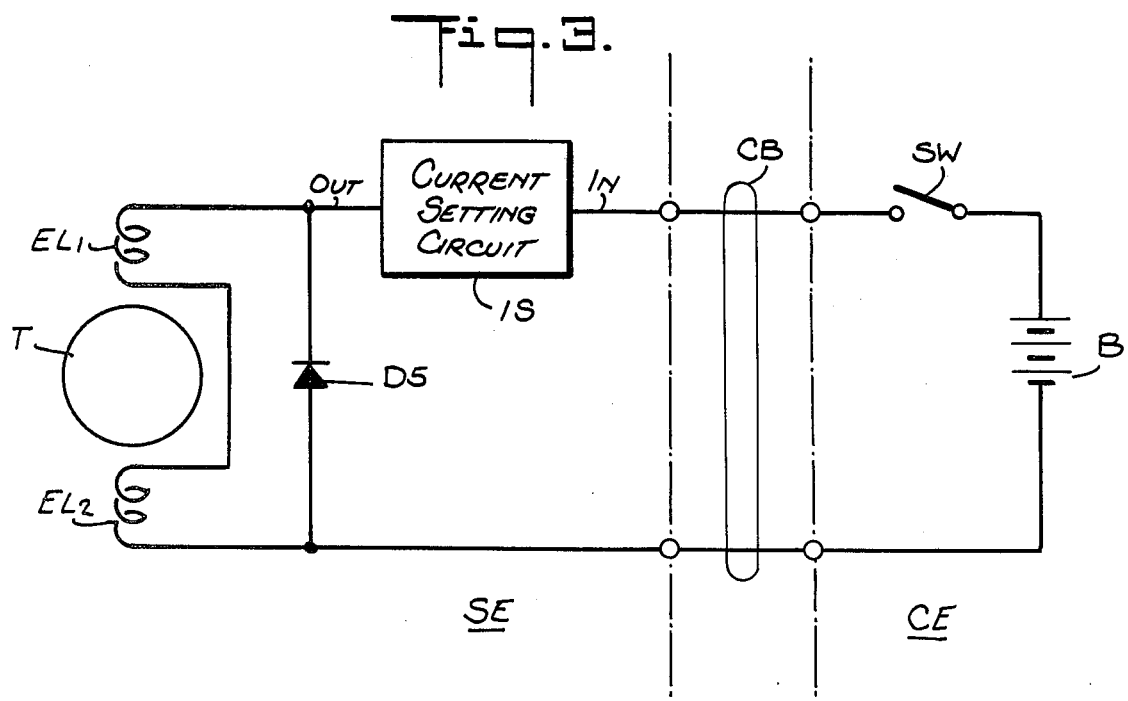
FIG. 3 is a block diagram of a second embodiment of the invention.
Figure 4A:
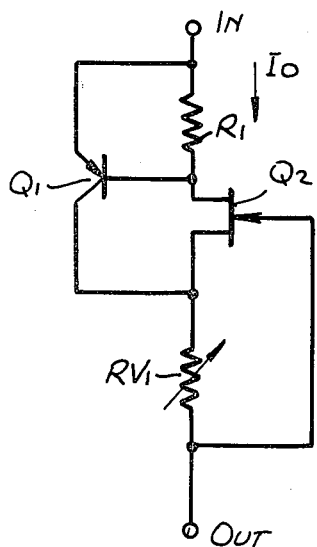
Figure 4B:
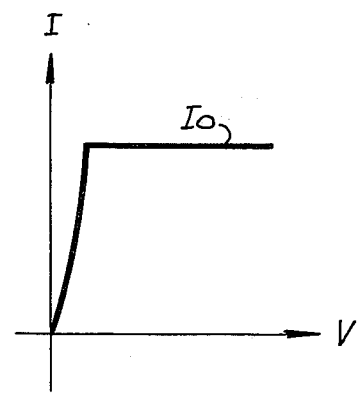
Figure 5:
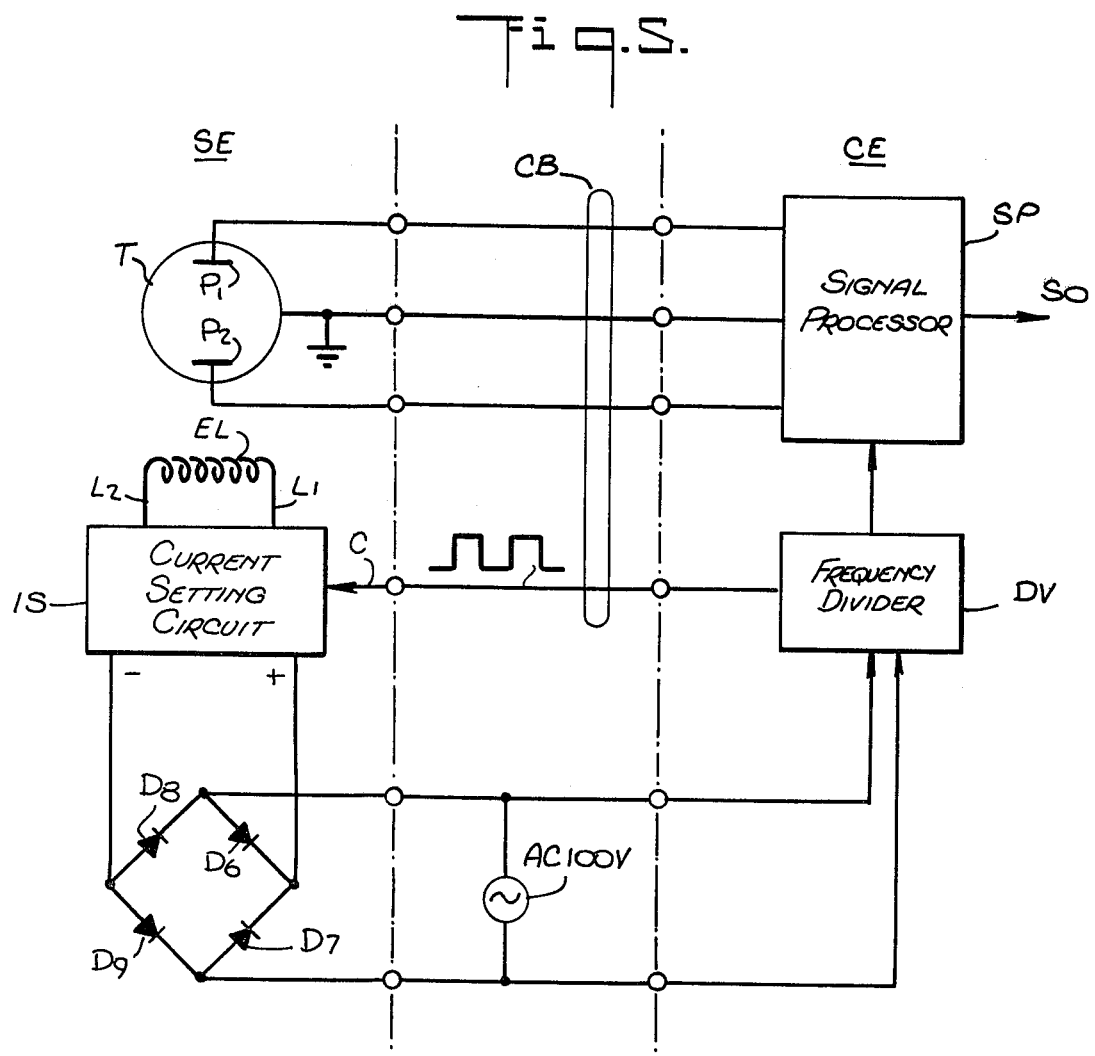

FIG. 4A schematically illustrates the current-setting circuit used in FIG. 3;

FIG. 4B is the characteristic curve of this current-setting circuit;

FIG. 5 is a block diagram of a third embodiment of the invention; and

Figure 6:
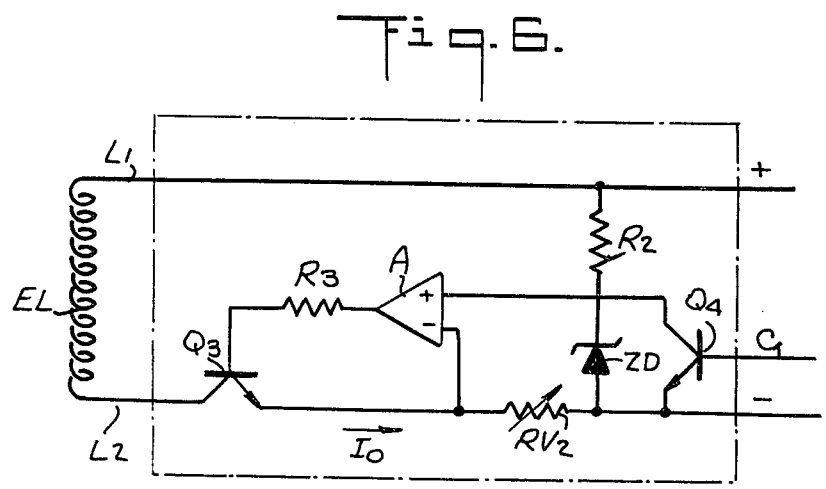

FIG. 6 schematically illustrates the current-setting circuit used in FIG. 5.

DESCRIPTION OF INVENTION

First Embodiment

Figure 1:
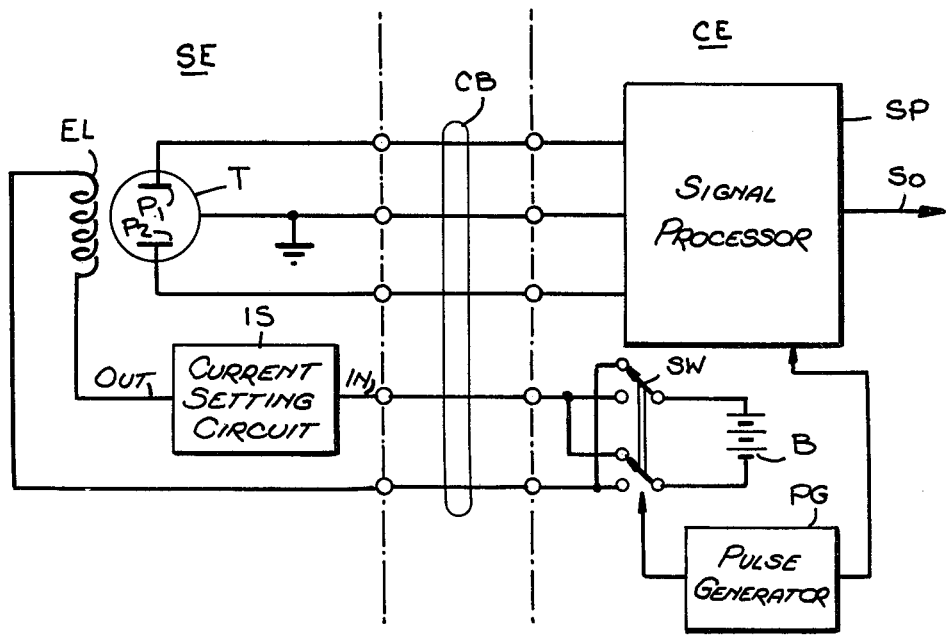

Referring now to FIG. 1, there is shown an electromagnetic flowmeter which makes use of an alternating rectangular current wave for excitation. The signal generator SE of the flowmeter includes a flow tube T having an insulated inner liner and provided with a pair of diametrically-opposed electrodes $P_1$ and $P_2$, an excitation coil EL and a current-setting circuit IS, all of these components being formed in a unitary structure.

Excitation coil EL is energized by a current applied thereto through current-setting circuit IS and a cable CB leading to a direct-current power supply B included in a converter CE. The flow-induced electromotive force signal yielded by electrodes $P_1$ and $P_2$ is fed via cable CB to a signal-processing circuit SP wherein 0 to 100% of the metered flow rate is converted to a standard output signal $S_o$, such as a current in a 4 to 20 mA range.

In converter CE there is also included a pulse generator PG and a switching circuit SW. When actuated by periodic pulses derived from generator PG, switch SW acts to apply the d-c output of power supply B in alternate directions to excitation coil EL to produce an alternating rectangular excitation current wave. These pulses are also applied to signal processor SP to effect synchronous rectification of the flow-induced signal yielded by electrodes $P_1$ and $P_2$.

Figure 2A:
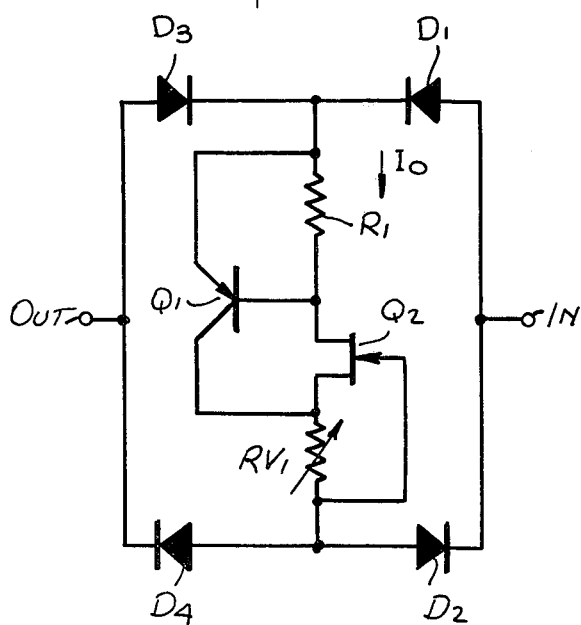
FIG. 2B is the characteristic curve of this current-setting circuit.
Figure 2B:
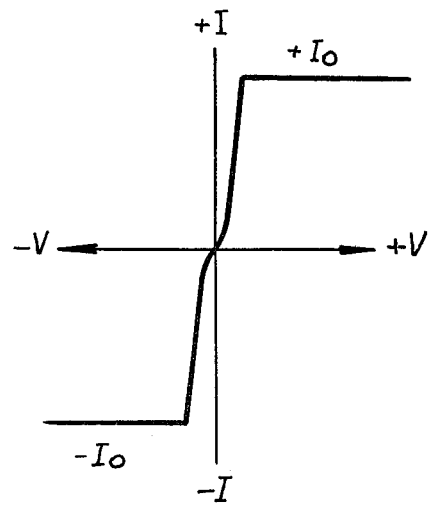

The current-setting circuit IS is shown schematically in FIG. 2A, the characteristic curve of this circuit being shown in FIG. 2B. The circuit includes an input terminal IN connected through diodes $D_1$ and $D_2$ in a bridge in series opposition, respectively with diodes $D_3$ and $D_4$ to an output terminal OUT. The cathodes of diodes $D_1$ and $D_3$ are rendered positive by the action of diodes $D_1$ and $D_4$ regardless of the polarity of a voltage V from power supply B applied across the input and output terminals.

The value of excitation current $I_o$ flowing between the upper junction of diodes $D_1$ and $D_3$ and the lower junction of diodes $D_2$ and $D_4$ is maintained constant by a constant-current circuit constituted by a resistor $R_1$ in series with a field effect transistor (FET) $Q_2$ and a variable resistor $RV_1$ connected between these junctions. A transistor $Q_1$ has its emitter connected to the upper junction, its collector connected to the upper end of resistor $RV_1$ and its base to the lower end of resistor $R_1$, the two transistors being in a Darlington circuit arrangement.

Thus when current $I_o$ increases, the terminal voltage of variable resistor $RV_1$ rises to bring about a negative bias on the FET transistor $Q_2$. When the drain current of FET $Q_2$ decreases, the base current of transistor $Q_1$ also decreases, causing a decrease in current $I_o$ flowing between the collector and emitter of transistor $Q_1$.

When excitation current $I_o$ decreases, the terminal voltage of variable resistor $RV_1$ drops, and consequently the base current of the transistor $Q_1$ increases to cause an increase in the excitation current flowing between its collector and emitter, whereby current $I_o$ is held constant regardless of the voltage V of power supply B.

The value of excitation current $I_o$ is set by variable resistor $RV_1$. By pre-setting current $I_o$ to a value at which the flow rate of the fluid flowing through flow tube T and the electromotive force developed between electrodes $P_1$ and $P_2$ bear a constant relationship dependent on the rating of converter CE, signal generator SE can be adjusted independently so long as the voltage V of power source B lies within a predetermined range. In addition, if signal generator SE is of the same rating, it can be used in combination with an arbitrary converter CE.

Second Embodiment

FIG. 3 is a block diagram of a second embodiment of the present invention which employs a single polarity rectangular wave for exciting the excitation coil. Switching circuit SW of converter CE is turned ON and OFF within a predetermined period, as is the case with FIG. 1, by which a single-polarity rectangular current wave is applied to divided excitation coils $EL_1$ and $EL_2$ of the signal generator SE. In FIG. 3, a diode $D_5$ is connected across the series connected coils $EL_1$ and $EL_2$ to provide a surge absorber.

In this case, a constant current circuit shown in FIG. 4(A) is employed as current-setting circuit IS. The current-setting circuit of FIG. 4(A) is arranged to omit diodes $D_1$ to $D_4$ of the FIG. 2(a) arrangement. This current-setting circuit exhibits a characteristic curve of the type shown in FIG. 4(B).

Third Embodiment

FIG. 5 is a block diagram illustrating the third embodiment which employs an external AC power supply AC 100 V as the excitation power source. In signal generator SE, the AC power supply AC 100 V is full-wave rectified to yield a DC current by means of a rectifier bridge composed of diodes $D_6$ to $D_9$. This DC current is supplied via current-setting circuit IS to excitation coil EL. In converter CE, the AC power supply AC 1000 V is frequency-divided by a frequency divider circuit DV to generate a rectangular frequency-divided output which is applied to the current-setting circuit IS to effect periodic switching thereof, thereby exciting excitation coil EL by a single-polarity rectangular current wave.

In this instance, a circuit arrangement shown in FIG. 6 is used as the current-setting circuit IS. In FIG. 6 a current is applied from a resistor $R_2$ to a Zener diode ZD and its Zener voltage is applied as a reference voltage to a non-inversion input of a differential amplifier A. At the same time, the terminal voltage of a variable resistor $RV_2$, which is yielded by the excitation current $I_o$, is applied to the inversion input of differential amplifier A, wherein a difference is detected between both input voltages. And the base current of a transistor $Q_3$ is controlled via a resistor $R_3$ in such a direction as to suppress a change in excitation current $I_o$.

A transistor $Q_4$ is periodically turned ON and OFF by the frequency-divided output from frequency divider circuit DV. When transistor $Q_4$ is turned ON, Zener diode ZD is short-circuited and, at this time, the output from differential amplifier A is rendered negative to turn OFF transistor $Q_3$, thereby effecting the desired switching action.

In FIG. 6, the value of excitation current $I_o$ is set by variable resistor $RV_2$.

Furthermore, transistors of collector permissible dissipation corresponding to the value of the excitation current $I_o$ are used as the transistors $Q_1$ and $Q_3$ of the current setting circuit IS. With an arrangement in which the current-setting circuit IS is built in the signal generator SE and the heat of transistors $Q_1$ and $Q_3$ is radiated to the casing of the signal generator SE, the cooling effect of the fluid increases because the excitation current $I_o$ must be increased in proportion to the diameter of the insulated flow tube T and because the flow quantity of the fluid also increases in accordance with the diameter of flow tube T.

Accordingly, by incorporating the current-setting circuit IS in signal generator SE, excitation current $I_o$ can be set and adjusted by an excitation power supply prepared independently without combining the signal generator SE with the converter CE; namely, the signal generator SE is complete in itself. Therefore, a desired signal generator can be combined with the converter CE if it is of the same rating. In this way, the replaceability of the signal generator SE is achieved and, at the same time, the necessity of field adjustment of the excitation current is obviated.

Besides, the current-setting circuit IS can be designed to correspond to the excitation current $I_o$ which depends on the diameter of the insulated flow tube T, and hence it can be made economical and highly accurate. Further, since the excitation current $I_o$ can be preset during the manufacture of the signal generator, the setting accuracy and precision of the system are enhanced, thereby ensuring high accuracy and precision in flow rate measurements.

As will be appreciated from the foregoing description, according to the present invention, replaceability with respect to the span between the signal generator and the converter can be realized and, merely by combining the signal generator and the converter, highly accurate and precise flow rate measurements can be achieved. This facilitates the installation of electromagnetic flowmeters and the replacement of the signal generator. Accordingly, the present invention is of great utility when employed in various electromagnetic flowmeters.

While there have been shown and described preferred embodiments of a signal generator for electromagnetic flowmeter in accordance with the invention, it will be appreciated that many changes and modifications may be made therein without, however, departing from the essential spirit thereof.

I claim:

1. In an electromagnetic flowmeter having a signal generator whose signal is applied to a converter, said generator comprising:
    A a flow tube having an insulated liner through which the fluid to be metered flows, and a pair of diametrically-opposed electrodes;

B a coil to establish an electromagnetic field in the flow tube to be intercepted by the fluid to induce a signal in the electrodes, which signal is applied to the converter;

C an excitation circuit to derive an excitation current from an external power supply and to feed the current to said coil, said power supply including a d-c source and a periodically actuated reversing switch coupled thereto to yield an alternating rectangular excitation current wave, each cycle of which has a current pulse of one polarity followed by a current pulse of opposite polarity; and D a current-setting circuit coupled to said excitation circuit for setting the alternating excitation current to a value establishing a constant relationship between the fluid flow rate and said signal, said current setting circuit being constituted by first and second pairs of diodes connected in series opposition, said pairs being connected in parallel opposition to define a rectifying bridge, said reversing switch being connected through the parallel pairs to said coil, and a constant-current network connected between the junction of the diodes in the first pair and the junction of the diodes in the second pair to maintain the pulses of opposite polarity in each cycle at a constant level.

2. A flowmeter as set forth in claim 1, wherein said reversing switch is periodically actuated by a pulse generator.

3. A flowmeter as set forth in claim 2, wherein said converter includes a synchronous rectifier operated by said pulse generator.

4. A flowmeter as set forth in claim 1, wherein said constant current network includes two transistors in a Darlington arrangement, the second transistor being a field effect transistor, said field effect transistor being connected between the diode junctions through a resistor.

* * * * *